P. W. MACKENZIE.
Manufacture of Gas.
No. 165,347.
Patented July 6, 1875.
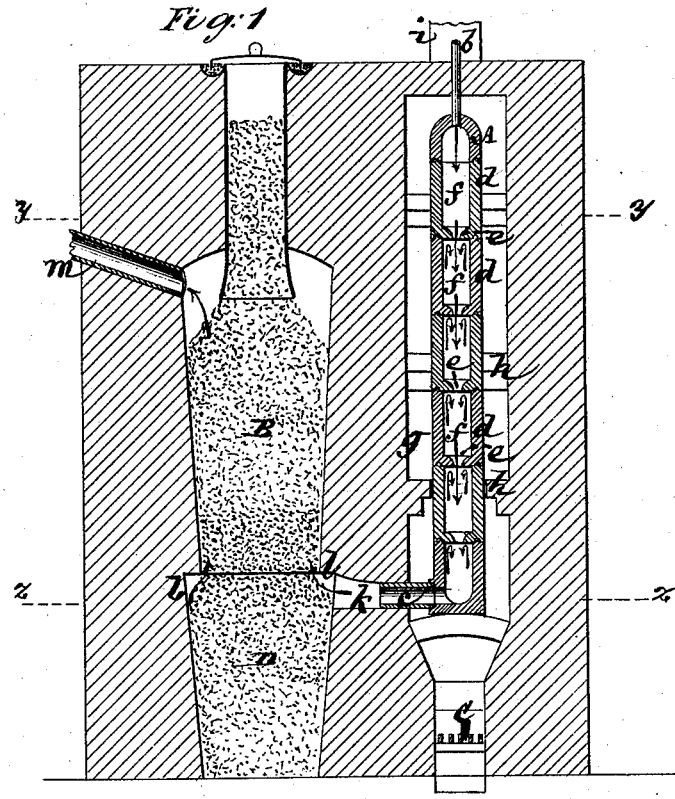
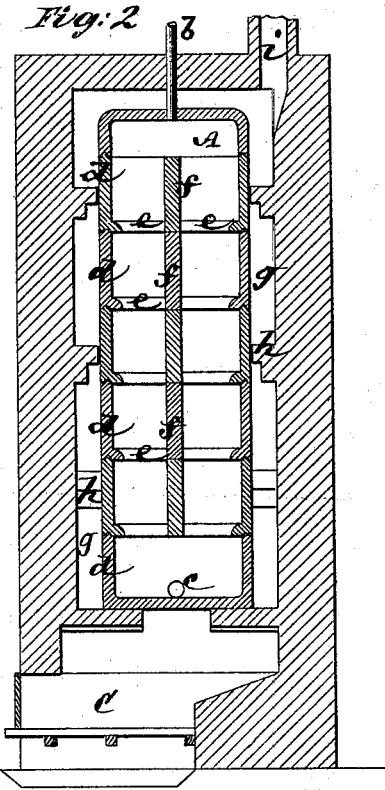
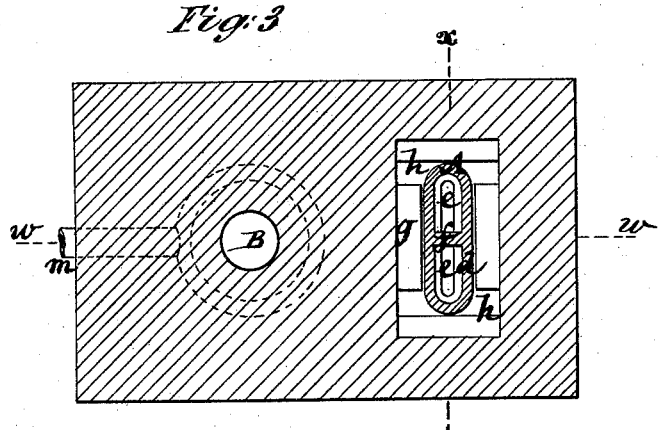
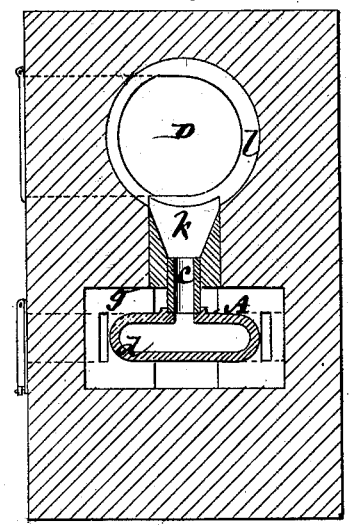
Witnesses:
Michael Ryan
J. Haynes
P. W. Mackenzie
by his Attorneys
Brown & Allen

UNITED STATES PATENT OFFICE.

PHILIP W. MACKENZIE, OF BLAUVELTVILLE, NEW YORK.

IMPROVEMENT IN THE MANUFACTURE OF GAS.

Specification forming part of Letters Patent No. 165,347, dated July 6, 1875; application filed May 8, 1875.

*To all whom it may concern:*

Be it known that I, PHILIP W. MACKENZIE, of Blauveltville, in the county of Rockland and State of New York, have invented certain new and useful improvements in the manufacture of gases by the combustion of carbon and the gases resulting from the decomposition of water; and I do hereby declare that the following is a full, clear, and exact description of the same, reference being had to the accompanying drawing, which forms part of this specification.

The object of this invention is to obtain a mixture of hydrogen and carbonic-oxide gas, which may be used for heating purposes, or which may have added to it a rich hydrocarbon-gas to produce a gas suitable for illumination; and to this end the invention consists in a novel process of producing the gas or gases by a continuous combustion of carbon and the gases resulting from the decomposition of water, without the aid of atmospheric air at intervals or otherwise, said combustion being supported entirely by the oxygen derived from the water, instead of, as in other methods of operating, first forcing or drawing air through the carbon or fuel in the producing-furnace, to bring the latter to a proper heat, then cutting off the air and introducing steam until the temperature is reduced too low for decomposition, next admitting air again, and so forth—that is, passing air and steam alternately to the producing-furnace. By my process the steam is continually supplied, and, after having been heated to a very high temperature by passing through a suitable retort, is introduced into a furnace or combustion-chamber containing coal, coke, or other carbonaceous matter, whereby the whole of the carbon is converted and utilized by a constant and continuous supply of oxygen derived from the steam or water alone.

In the accompanying drawing, Figure 1 represents a vertical section (mainly on the line *w w* in Fig. 3) of an apparatus for carrying out my invention; Fig. 2, a further vertical section on the line *x x* of Fig. 3; Fig. 3, a horizontal section on the line *y y* of Fig. 1; and Fig. 4, a further horizontal section on the line *z z* of Fig. 1.

A is an upright retort, down and through which the steam or vapor, introduced by an inlet or pipe, *b*, from above, is made to circulate or pass, and finally escape by a pipe or passage, *c*, to the furnace or combustion-chamber B. This retort A is made up of a series of sections, *d d*, mounted one upon the other. These sections, excepting it may be the top and bottom one of all, are divided each into separate compartments by vertical partitions *f*, and are provided at their bottoms with contracted openings *e* on reverse sides of the partition *f*. This construction not only prevents a direct circulation throughout the length of the retort, but the steam, supplied from any suitable generator, entering the retort at top, is caused to circulate up and down within each section *d* in succession, by reason of the superior heat near the inner sides of the walls of the retort to that at the center of the same. This up-and-down circulation of the steam takes place in each of said partitioned sections during the descent of the steam throughout the length of the retort as it passes from section to section through the contracted openings *e*, before ultimately escaping by the outlet *c* at the bottom of the retort.

By means of a retort constructed to operate as described I am enabled to impart a very high temperature to the steam before it enters the combustion-chamber or furnace, and this intense superheating of the steam is moreover accomplished in a gradual manner, or by a series of stages, the one succeeding the other, but without any interruption as regards the continuous flow of the steam through the retort. In this way, or by these means, I am enabled to keep up a continuous combustion of the carbon and the gases resulting from the decomposition of steam or water without the introduction of atmospheric air, and so that said combustion is supported entirely by the oxygen derived from the water.

Said retort A may be heated by an ordinary fire-place, C, from which the gaseous products of combustion pass to an outside or inclosing vertical flue, *g*, and ultimately escape by one or more outlets, *i*. The heat obtained by the steam by the time it reaches the lowest of the sections *d* of the retort is only limited by the capacity of the materials to withstand the fire. From the lower one of the sections *d* of the retort the highly-superheated steam passes immediately into the combustion-chamber or furnace B before it suffers any loss in its temperature, and while it is very nearly or quite at the temperature of the chamber B, so that the liberated hydrogen will not reduce the temperature of the latter.

The combustion-chamber or producing-furnace B is constructed of the most refractory and non-conducting materials which are conveniently attainable, and may vary in its general contour; but I prefer to make it of round or oval shape in its horizontal section. Furthermore, said combustion-chamber or furnace, which is a self-feeder, is made without a grate, and the cinder and ash pit D of larger dimensions at its top than the base or lower end of the combustion-chamber, with which it is in free or open communication. This admits of the uninterrupted circulation of the intensely-heated steam as it comes from the retort over the distributing-arch $k$, and round or into a channel, $l$, around the burning fuel at the base of the combustion-chamber, and which serves to insure the entrance of the superheated steam in such manner as to be thoroughly diffused within the combustion-chamber from below, and up through the burning fuel in the latter.

To put the process in operation, fire is kindled in the lower part of the furnace or chamber B, which should be filled up through the opening at the top with the coal, coke, or other carbon, and fire should also be kindled under the retort A. As soon as the carbon in the furnace or chamber B has all been thoroughly ignited, and the retort has been heated to a white, or nearly white, heat, the cover of the furnace is put on and hermetically sealed, and its ash-pit door closed perfectly tight. Steam is then admitted through the pipe $b$ to the retort, and, circulating downward through the same, becomes highly superheated, in which condition it enters the furnace or chamber B, wherein it is brought in contact with the carbon, and its oxygen enters into combustion therewith. The first product of this combustion is carbonic acid and hydrogen; but as the carbonic acid rises in the furnace or chamber it is deprived of another equivalent of oxygen, and is converted into carbonic oxide, and the mixture of hydrogen and carbonic oxide passes out at the outlet $m$, which is provided in the upper part of the furnace or chamber, and whence it is conducted to a furnace in which it may be required to be used for heating purposes, or whence it may be taken to be enriched for the purpose of illumination. A fresh supply of coal or carbonaceous matter is introduced at such intervals as may be found desirable by removing the cover from the top of the furnace or chamber B, which is afterward again closed and sealed; but this involves no interruption to the process of producing the gases.

The construction of the furnace or producing-chamber B and of the retort A may be varied. The construction described forms no part of the present invention, but forms the subject of a separate application for Letters Patent, and is simply here described as being that which I have in successful practical operation, effecting an enormous saving of coal or coke in the production of gas.

It is obvious that the steam, instead of being supplied from a separate generator to the retort, might be generated in the retort itself by the introduction of a jet of water thereinto.

What I claim as my invention is—

The process of generating hydrogen and carbonic-oxide gases, which consists in burning coke, anthracite coal, or like carbonaceous material until it is at a white heat, then secluding the incandescent material from the outer air, and then passing into the material, solely so heated, and continuously so secluded, and from time to time fed with additional material, the gases derived from steam heated to its decomposing temperature, while those gases are at such temperature, whereby the high heat of the carbonaceous material, the application of the hot gases, and the production of the final gases are continuously maintained, as set forth.

Witnesses:      P. W. MACKENZIE.
- A. GREGORY,
VERNON H. HARRIS.